# 2,772,310

ARALKYL QUATERNARY AMMONIUM BASES AND SALTS

Leo R. Morris, Midland, Mich., assignor to The Dow Chemical Company, Midland, Mich., a corporation of Delaware No Drawing. Application May 13, 1955,
Serial No. 508,298

9 Claims. (Cl. 260—567.6)

This invention concerns certain new quaternary ammonium compositions of the aralkyl type. It relates more particularly to quaternary ammonium bases and salts having the general formula:

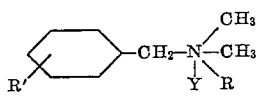

wherein R represents an alkyl radical containing from 12 to 18 carbon atoms, Y is an anion and R' is a member of the group consisting of the 2-bromoethyl radical and the vinyl radical. The invention pertains especially to the vinyl-benzyl quaternary ammonium bases and salts thereof, and relates to polymeric compositions of the same.

The new quaternary ammonium compositions having the above formula are all soluble in organic solvents such as benzene, toluene, xylene, chlorobenzene, methanol, ethanol, isopropanol, acetone, methyl ethyl ketone, ethylene dichloride, or chloroform. They are sparingly soluble in water, i. e. they dissolve in water to form aqueous solutions containing two percent by weight or less of said compounds as solute. The new compositions are useful as wetting agents, detergents, or dispersants, e. g. for forming aqueous emulsions of water immiscible organic liquids or dispersing such liquids in aqueous solutions. They are useful as emulsifying agents for polymerizing vinyl and vinylidene compounds in aqueous solutions to obtain aqueous colloidal dispersions or synthetic latexes of the polymerized vinyl or vinylidene compounds. They are useful emulsifying agents for preparing water-in-oil type emulsions. They are useful in the preparation of aqueous agricultural spray compositions. For instance, the active ingredient, e. g. 2,4-dichlorophenoxyacetic acid isopropyl ester, or meta-cresol, of a spray composition may be dissolved in an oil or other organic solvent and the solution converted to a water-in-oil type emulsion concentrate by means of the quaternary ammonium compositions of the invention. The concentrate is then diluted with water to form an aqueous spray composition. The quaternary ammonium compositions are useful as agents for preventing the build up of static charges of electricity on plastics, e. g. by applying a thin film of the material to sheets or films of polystyrene. The new aralkyl quaternary ammonium compositions are useful as starting materials in the preparation of other chemical compounds, e. g. the new ar-(2-bromoethyl)-benzyl quaternary ammonium chlorides or bromides are dehydrobrominated to form the corresponding vinylbenzyl quaternary ammonium chlorides or bromides of the invention. The vinylbenzyl quaternary ammonium chlorides or bromides can be polymerized alone or with other copolymerizable monoethylenically unsaturated vinyl or vinylidene compounds, e. g. acrylonitrile.

The ar-(2-bromoethyl)benzyl quaternary ammonium chlorides or bromides having the aforementioned general formula wherein Y is a chloride or bromide ion are prepared by reacting an ar-(2-bromoethyl)benzyl halide such as ortho-, meta-, or para-(2-bromoethyl)benzyl chloride, or ortho-, meta-, or para-(2-bromoethyl)benzyl bromide, with a tertiary amine of the formula

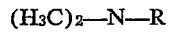

wherein R is an alkyl radical containing from 12 to 18 carbon atoms.

The ar-(2-bromoethyl)benzyl halide starting material can be prepared by haloalkylating (2-bromoethyl)benzene, e. g. by reacting a halomethylating agent such as a mixture of para-formaldehyde and hydrochloric acid, or chloromethyl methyl ether or bromomethyl methyl ether and a Friedel-Crafts catalyst with (2-bromoethyl)benzene in usual ways (see "Organic Reactions" volume I, chapter 3, page 63 et seq., John Wiley & Sons Inc., New York city, 1942).

The tertiary amine starting material can be prepared by reaction of dodecylamine, hexadecylamine or octadecylamine with formic acid and formaldehyde employing a procedure described by R. A. Beck et al. in J. Organic Chemistry, volume 12, page 512 (1947), or by A. W. Ralston et al., J. Amer. Chem. Soc., volume 69, page 2096 (1947). Examples of suitable tertiary amines are dimethyldodecylamine, dimethylhexadecylamine or dimethyloctadecylamine.

The reaction of the tertiary amine with the (2-bromoethyl)benzyl chloride or bromide can be carried out at temperatures between 0° and 110° C., preferably in the presence of an inert organic liquid such as acetone, methyl ethyl ketone, petroleum ether, benzene, toluene, xylene, chlorobenzene, methyl alcohol, ethyl alcohol, ethylene dichloride, etc., that is a solvent for the reactants. The product is recovered by evaporating the solvent and is obtained as the corresponding (2-bromoethyl)benzyl quaternary ammonium chloride or bromide.

The (2-bromoethyl)benzyl quaternary ammonium hydroxides are prepared by treating a solution of the (2-bromoethyl)benzyl quaternary ammonium chloride or bromide in a solvent, e. g. methyl alcohol, with an insoluble resinous quaternary ammonium base, e. g. an anion exchange resin of the type disclosed in U. S. Patent No. 2,614,099. The (2-bromoethyl)benzyl quaternary ammonium salts such as the nitrate or sulfate salts can be prepared by neutralizing the (2-bromoethyl)benzyl quaternary ammonium hydroxide with nitric acid or sulfuric acid, or by treating a solution of the (2-bromoethyl)-benzyl quaternary ammonium hydroxide, or a salt thereof, with a quaternary ammonium anion exchange resin in a form containing an ion of the kind to be substituted.

The vinylbenzyl quaternary ammonium chloride or bromide compositions can be prepared by dehydrobrominating the (2-bromoethyl)benzyl quaternary ammonium chloride or bromide as previously mentioned. The dehydrobromination can be carried out by heating a solution of the (2-bromoethyl)benzyl quaternary ammonium bromide or chloride in an organic liquid and in admixture with an aqueous or an alcoholic solution of an alkali metal hydroxide such as sodium hydroxide or potassium hydroxide at temperatures between 0° and 110° C. The alkali metal hydroxide is employed in amount corresponding to at least one, preferably from one to two, gram molecular proportions per gram molecular equivalent proportion of the (2-bromoethyl)benzyl quaternary ammonium chloride or bromide used. The solution is neutralized with an acid such as hydrochloric or hydrobromic acid, if alkaline. The vinylbenzyl quaternary ammonium chloride or bromide is recovered by filtering the solution, if organic, to separate the inorganic salt, or by separating the organic and aqueous layers, and evaporating the organic solvent. In an alternate procedure, the vinylbenzyl quaternary ammonium chloride or bromide compositions are conveniently prepared by reacting a tertiary amine of the aforementioned formula (H₃C)₂—N—R wherein R is an alkyl radical containing from 12 to 18 carbon atoms with vinylbenzyl chloride or vinylbenzyl bromide.

The vinylbenzyl quaternary ammonium hydroxides are prepared by treating a solution of the vinylbenzyl quaternary ammonium chloride or bromide in a solvent such as methyl alcohol with the hydroxide form of a quaternary ammonium anion exchange resin. The corresponding nitrate or sulfate salts are prepared by neutralizing the vinylbenzyl quaternary ammonium base with nitric acid or sulfuric acid. The vinylbenzyl quaternary ammonium compositions are obtained as the chloride or bromide salt as usually prepared, and such salts are preferred.

The vinylbenzyl quaternary ammonium compositions can be polymerized to obtain polymeric products which range from viscous liquids to waxy to granular white or slightly yellow solids, depending in part upon the molecular weight of the polymer formed. The polymers can be prepared by heating the monomers in bulk, or dispersed in a solvent such as water or benzene, at temperatures between 60° and 120° C. and at atmospheric or superatmospheric pressures.

The polymerization is accelerated by the addition of catalysts such as sodium persulfate, potassium persulfate, hydrogen peroxide, benzoyl peroxide, lauroyl peroxide, tert.-butylperbenzoate, etc. The catalysts are usually employed in amounts of from 0.1 to 2 percent by weight of the material to be polymerized.

The following examples illustrate ways in which the principle of the invention has been applied but are not to be construed as limiting its scope.

Example 1

A charge of 163 grams (0.7 mole) of para-(2-bromoethyl)benzyl chloride melting at temperatures of from 52.5° to 53.5° C., together with 150 ml. of acetone, was placed in a glass reaction vessel equipped with a reflux condenser and stirrer. The mixture was stirred and maintained at a temperature of 10° C. while adding a solution of 149 grams (0.7 mole) of dimethyldodecylamine in 100 ml. of petroleum ether (boiling point 30°–60° C.) dropwise over a period of one hour. The resulting mixture was stirred and heated at a temperature of 50° C. for one hour. Thereafter, the solvent was removed by heating the mixture at 50° C. under reduced pressure. The residue was washed twice with petroleum ether then dried by heating the same at a temperature of 50° C. at 0.3 millimeter absolute pressure for a period of 24 hours. There was obtained 268.4 grams (0.6 mole) of para-(2-bromoethyl)benzyl N,N-dimethyl-N-dodecyl ammonium bromide-chloride as a viscous light yellow liquid. It was analyzed and found to contain 18.4 percent by weight of bromine and 7.85 percent of chloride. The product was a mixture of (2-bromoethyl)benzyl N,N-dimethyl-N-dodecyl ammonium bromide and chloride salts. A portion of the product was dissolved in benzene to form a solution containing 5 percent by weight of said product. The solution had an absolute viscosity of 0.78 centipoise at 25° C. The compound para-(2-bromoethyl)benzyl dimethyldodecyl ammonium chloride has the probable structural formula:

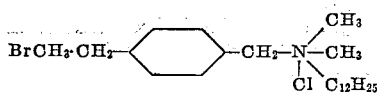

The yield of product was 86 percent based on the para-(2-bromoethyl)benzyl chloride initially used.

An aqueous spray composition was prepared by shaking a mixture of 12 drops of 2,4-dichlorophenoxyacetic acid isopropyl ester and 24 drops of "Penola Heavy Aromatic Naphtha" (boiling range 313°–526° F. and 83 percent aromatic) with 4 ml. of water containing 0.05 gram of the para-(2-bromoethyl)benzyl dimethyldodecyl ammonium bromide-chloride product. A stable aqueous emulsion was obtained.

Example 2

A charge of 206 grams of para-(2-bromoethyl)benzyl dimethyldodecyl ammonium chloride, together with a solution of 650 ml. of ethyl alcohol and 37.5 grams of sodium hydroxide was stirred and maintained at temperatures between 23° and 25° C. for a period of 2.6 hours. The mixture was filtered to separate the inorganic salt. The filtrate was evaporated to dryness under reduced pressure. There was obtained 175 grams of para-vinylbenzyl dimethyldodecyl ammonium bromide-chloride as a white waxy solid. It was analyzed and found to contain 16.15 percent by weight of bromine and 1.49 percent of chlorine. A portion of the product was dissolved in benzene to form a solution containing 5 grams of the product per 100 ml. of the benzene. The solution had a specific viscosity of 0.226 at 25° C. An aqueous solution containing 1.25 percent by weight of the product foamed upon shaking. The product had surface active properties. An aqueous spray composition was prepared by shaking a mixture of 12 drops of meta-cresol and 4.5 ml. of water containing 0.05 gram of the para-vinylbenzyl dimethyldodecyl ammonium bromide-chloride product. A stable aqueous emulsion was obtained. The compound para-vinylbenzyl dimethyldodecyl ammonium bromide has the formula:

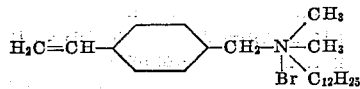

Example 3

A charge of 50 grams (0.11 mole) of the para-(2-bromoethyl)benzyl dimethyldodecyl ammonium bromide-chloride product, prepared in Example 1, and 50 ml. of absolute ethyl alcohol was placed in a dropping funnel. The mixture was added slowly with stirring to a solution of 150 ml. of water and 9 grams (0.22 mole) of sodium hydroxide at room temperature over a period of 20 minutes. Thereafter, the mixture was stirred and heated at a temperature of 65° C. for a period of 5 hours, then cooled. The product separated as a waxy solid. The liquid was decanted. The product was washed with water and dried by heating the same in a vacuum oven at a temperature of 32° C. There was obtained 42 grams of para-vinylbenzyl dimethyldodecyl ammonium bromide-chloride as a yellow waxy solid.

Example 4

A charge of 4 grams of para-vinylbenzyl dimethyldodecyl ammonium bromide-chloride (about 83 percent by weight bromide salt and 17 percent chloride salt) was dissolved in 100 ml. of methyl alcohol. A charge of 55 grams of an insoluble resinous quaternary ammonium base, i. e. an anion exchange resin, was added. The mixture was stirred for 30 minutes, then filtered to separate the resin. The para-vinylbenzyl dimethyldodecyl ammonium salts were about 85 percent converted to the para-vinylbenzyl dimethyldodecyl ammonium hydroxide. The product was recovered by evaporating the solvent. There was obtained 3.7 grams of product. It was soluble in water and methyl alcohol. The product was dissolved in a solvent mixture of equal parts by volume of benzene and methanol to form a solution containing 2.5 percent by weight of the product per 100 ml. of the solvent. The solution had a specific viscosity of 0.117 at 25° C. The compound para-vinylbenzyl dimethyldodecyl ammonium hydroxide has the formula:

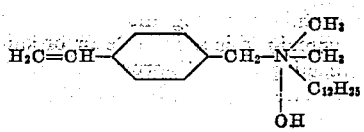

Example 5

A charge of 46.3 grams (0.2 mole) of ar-(2-bromoethyl)benzyl chloride, a colorless liquid boiling at temperatures between 120° and 124° C. at 3 millimeters absolute pressure and having a refractive index $n_D^{25}=1.5723$, was placed in a glass reaction flask equipped with a reflux condenser and stirrer. Fifty milliliters of petroleum ether (boiling point 86°–100° C.) was added. The mixture was stirred and 53.7 grams (0.2 mole) of dimethylhexadecylamine added. The resulting mixture was stirred and heated at a reflux temperature for 1.5 hours, then cooled to room temperature. A portion of the petroleum ether solvent had separated. It was decanted. The residue was washed with petroleum ether and dried by heating the same at a temperature of 70° C. at 10 millimeters absolute pressure for 48 hours. The product was a viscous amber material and was obtained in substantially quantitative yield. It was soluble in methanol, ethanol, acetone, and benzene and only slightly soluble in water. Upon standing at room temperature for one week the product solidified to a white waxy solid having a melting point between 50° and 52° C. The ar-(2-bromoethyl)benzyl dimethylhexadecyl quaternary ammonium chloride has the probable formula:

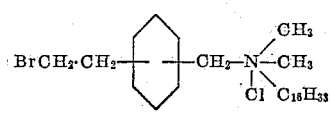

The product was tested for emulsifying properties as described in Example 1. A stable aqueous emulsion was obtained.

Example 6

A charge of 15 grams of the ar-(2-bromoethyl)benzyl dimethylhexadecyl ammonium chloride prepared in Example 5, was added to a solution of 50 ml. of water and 2.5 grams of potassium hydroxide. The mixture was heated at a reflux temperature for 30 minutes, then was neutralized to a pH value of 6 with an aqueous concentrated solution of hydrochloric acid. The mixture was cooled. The product separated as a waxy solid. The aqueous liquor was decanted. The product was washed with water and dried. The vinylbenzyl dimethylhexadecyl ammonium chloride product was obtained as a white waxy solid. It was soluble in ethyl alcohol, acetone and benzene. It was slightly soluble in water. A solution of the product in water foamed upon shaking or vigorous stirring. The vinylbenzyl dimethylhexadecyl ammonium chloride has the probable formula:

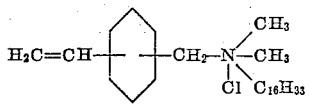

Example 7

A charge of 152 grams (0.64 mole) of para-(2-bromoethyl)benzyl chloride, together with 150 ml. of acetone, was placed in a glass reaction vessel equipped with a reflux condenser and stirrer. The mixture was stirred and maintained at 10° C. while adding a solution of 193 grams (0.65 mole) of dimethyloctadecyl dissolved in 200 ml. of acetone over a period of 0.5 hour. Stirring of the mixture was continued over a period of 0.5 hour longer. Thereafter, the mixture was cooled to 0° C. The product separated as a solid. It was removed from the solvent. The product was dried by heating the same at temperatures between 30° and 40° C. at 10 millimeters absolute pressure for approximately 15 hours. There was obtained 330 grams (0.65 mole) of para-(2-bromoethyl)benzyl dimethyloctadecyl ammonium chloride as a tan colored waxy solid that softened at a temperature of 60° C. and was liquid at 90° C. The product dissolved in water at 70° C. to form an aqueous solution containing one percent by weight of said product. It dissolved in benzene at 50° C. to form a 4 weight percent solution of said product. An aqueous solution containing 0.5 percent by weight of said product had an absolute viscosity of 0.95 centipoise at 25° C. The para-(2-bromoethyl)benzyl dimethyloctadecyl ammonium chloride has the probable formula:

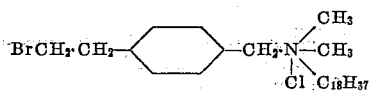

Example 8

A charge of 53.1 grams of the para-(2-bromoethyl)benzyl dimethyloctadecyl ammonium chloride prepared in Example 7, together with a solution of 150 ml. of ethyl alcohol and 11.2 grams of potassium hydroxide was placed in a glass reaction flask and heated at refluxing temperatures with stirring for a period of 20 minutes. The solution was neutralized to a pH value of 7 with an alcoholic solution of hydrochloric acid, then cooled to —20° C. and filtered to separate the inorganic salt. The filtrate was evaporated. The residue was washed with water and dried. There was obtained 39 grams of vinylbenzyl dimethyloctadecyl ammonium chloride as a tan powder. It was soluble in acetone, ethyl alcohol, chloroform or benzene. The product was slightly soluble in water. An aqueous solution of the product had a pH value of 7 and foamed when shaken. The product melted at temperatures between 150° and 155° C. A solution of 0.5 gram of the product in 100 ml. of benzene at 25° C. had a specific viscosity of 0.043 centipoise. The para-vinylbenzyl dimethyloctadecyl ammonium chloride has the formula:

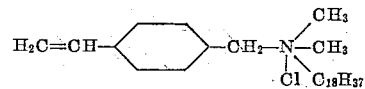

Example 9

A charge of 14.5 grams of (2-bromoethyl)benzyl dimethylhexadecyl ammonium chloride, together with 50 ml. of water and 2.5 grams of potassium hydroxide, was placed in a glass reaction vessel equipped with a reflux condenser and stirrer. The mixture was stirred and heated at a temperature of about 100° C. for a period of three hours, then cooled. The mixture was neutralized to a pH value of 7 by adding an aqueous solution of hydrochloric acid thereto. The solution contained vinylbenzyl dimethylhexadecyl ammonium chloride. A charge of 0.015 gram of sodium persulfate was added to the above solution of vinylbenzyl dimethylhexadecyl ammonium chloride, as polymerization catalyst. The mixture was stirred and heated at about 100° C. for 15 hours. A soft solid product separated from the aqueous liquid. It was dissolved in 100 ml. of chloroform and was separated from the aqueous liquor. The solution of the product in the chloroform was added with stirring to 2 liters of petroleum ether (boiling point 86°–100° C.) at temperatures between 0° and 10° C. to precipitate the product. The product was separated by filtering and was dried. There was obtained 12.6 grams of a granular slightly yellow powder.

A portion of the powder was dissolved in chloroform to form a solution containing 0.5 gram of the product per 100 ml. of the solvent. The solution had an absolute viscosity of 0.59 centipoise at 25° C. This corresponds to a specific viscosity of 0.092 cps. The product was a homopolymer of vinylbenzyl dimethylhexadecyl ammonium chloride.

Example 10

A charge of 2.5 grams of vinylbenzyl dimethyloctadecyl ammonium chloride and 25 ml. of water, together with 0.05 gram of sodium persulfate as catalyst was heated at a reflux temperature for a period of 3.5 hours, then cooled. The product was recovered employing procedure similar to that employed in Example 9. The product was a white granular solid. It was polymerized vinylbenzyl dimethyloctadecyl ammonium chloride. A solution of 0.5 gram of the polymer in 100 ml. of chloroform at 25° C. had a specific viscosity of 0.695.

*Example 11*

A charge of 2.5 grams of vinylbenzyl dimethyldodecyl ammonium chloride and 25 ml. of benzene, together with 0.005 gram of sodium persulfate as polymerization catalyst was heated at a temperature of about 80° C. for 10 hours. The product was recovered by evaporating the solvent. The product was a homopolymer of vinylbenzyl dimethydodecyl ammonium chloride. A solution of 0.5 gram of the polymer in 100 ml. of benzene at 25° C. had a specific viscosity of 5.27 centipoises.

I claim:

1. A composition of matter consisting of an aralkyl quaternary ammonium compound having the formula:

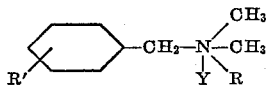

wherein R represents an alkyl radical containing from 12 to 18 carbon atoms, R' is a member of the group consisting of the 2-bromoethyl radical and the vinyl radical and Y is an anion selected from the group consisting of the chloride, bromide, nitrate, sulfate and hydroxide ions.

2. A composition of matter consisting of a (2-bromoethyl)-benzyl quaternary ammonium compound having the formula:

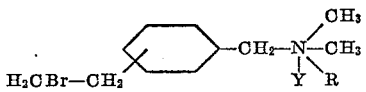

wherein R represents an alkyl radical containing from 12 to 18 carbon atoms and Y is an anion selected from the group consisting of the chloride, bromide, nitrate, sulfate and hydroxide ions.

3. A composition of matter consisting of a (2-bromoethyl)-benzyl quaternary ammonium chloride having the formula:

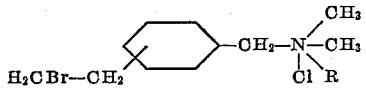

wherein R is an alkyl radical containing from 12 to 18 carbon atoms.

4. A composition of matter consisting of a vinylbenzyl quaternary ammonium compound having the formula:

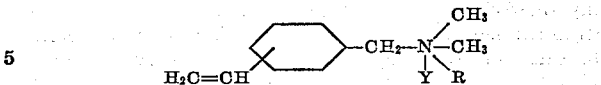

wherein R represents an alkyl radical containing from 12 to 18 carbon atoms and Y is an anion selected from the group consisting of the chloride, bromide, nitrate, sulfate and hydroxide ions.

5. A composition of matter consisting of a vinylbenzyl quaternary ammonium hydroxide having the formula:

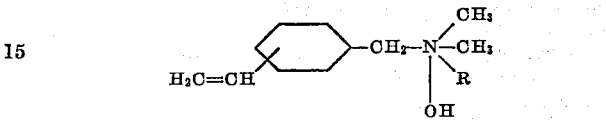

wherein R represents an alkyl radical containing from 12 to 18 carbon atoms.

6. A composition of matter consisting of a vinylbenzyl quaternary ammonium chloride having the formula:

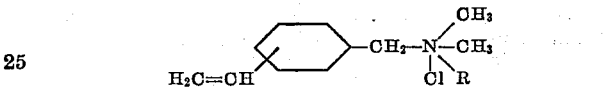

wherein R represents an alkyl radical containing from 12 to 18 carbon atoms.

7. A composition of matter consisting of a vinylbenzyl dimethyldodecyl ammonium chloride having the formula:

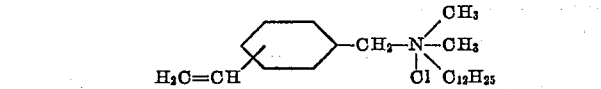

8. Para-vinylbenzyl dimethyldodecyl ammonium chloride.

9. Para-vinylbenzyl dimethyloctadecyl ammonium chloride.

References Cited in the file of this patent

UNITED STATES PATENTS

| | | |
|---|---|---|
| 2,609,393 | Crossley | Sept. 2, 1952 |
| 2,628,224 | Cairns et al. | Feb. 10, 1953 |
| 2,670,335 | D'Alelio | Feb. 23, 1954 |
| 2,697,080 | D'Alelio | Dec. 14, 1954 |
| 2,702,795 | Gilwood | Feb. 22, 1955 |

OTHER REFERENCES

Braun: "Ber deut chem," vol. 49, pp. 2634–35 (1916).
Braun: "Ber deut chem," vol. 50, p. 46 (1917).
Braun: "Ber deut chem," vol. 51, pp. 102–3 (1918).